Figure 1:
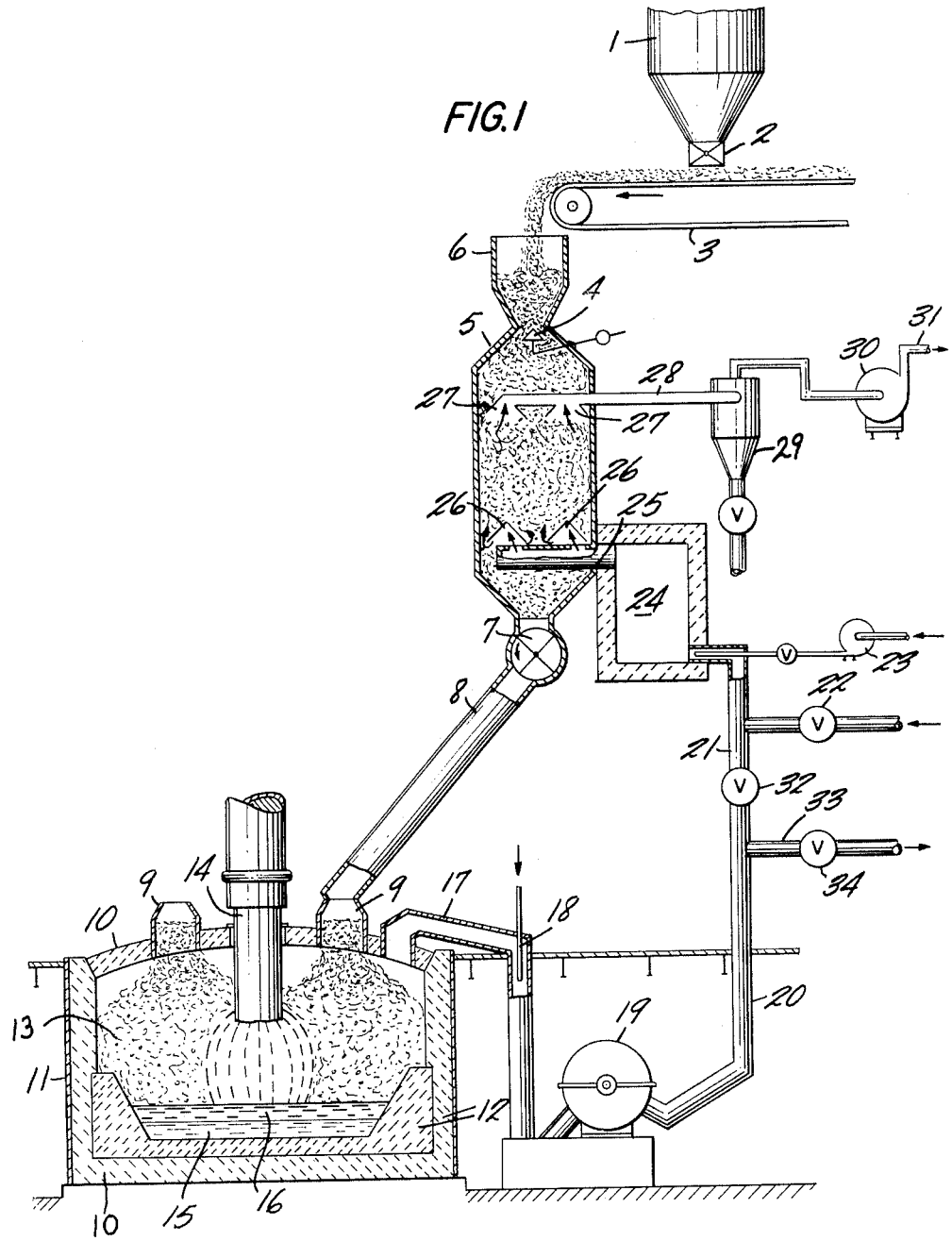
Figure 2:
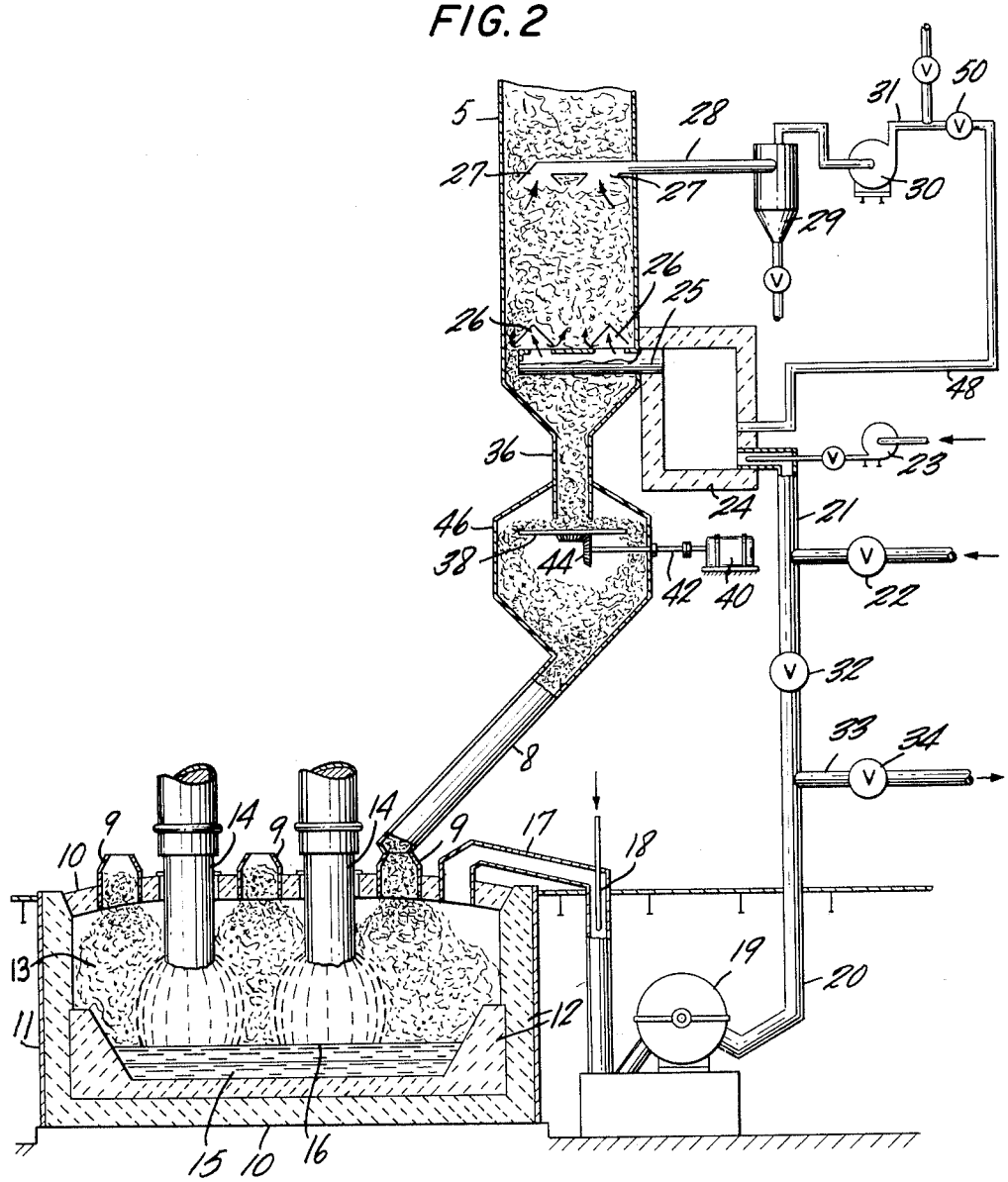

3,163,520
PROCESS AND APPARATUS FOR PREHEATING AND PRE-REDUCTION OF CHARGE TO ELECTRIC FURNACE

Fredrik Christen Collin, Oslo, and Toralv Båsen, Vagsbygd, near Kristiansand, Norway, assignors to Elektrokemisk A/S, Oslo, Norway, a corporation of Norway
Filed Dec. 15, 1961, Ser. No. 159,635
Claims priority, application Norway Dec. 27, 1960
8 Claims. (Cl. 75—10)

This application is a continuation-in-part of an earlier filed application Serial No. 107,286, filed May 1, 1961, now U.S. Patent No. 3,033,673, granted May 8, 1962, and entitled Process of Reducing Iron Oxides.

As described in the earlier filed application, one of the recognized problems in connection with the direct reduction of iron ore has to do with the reduction of pellets made up of the iron ore and a reducing agent such as powdered coal or coke. The reduction of such pellets either to produce sponge iron or as a preliminary to further reduction in an electric smelting furnace has been frequently suggested, but so far no economical method of practicing such a process has been evolved.

We have now discovered that the principal problem with such a process arises from the fact that in normal case air is used to burn the fuel employed to supply the necessary heat and customarily sufficient air is supplied also to burn the CO in the gas generated during the reduction, so that additional thermal efficiency is obtained. As a result the flame or heating gas employed has an oxidizing effect and we have found that because of this a continuous reoxidation is taking place upon the surface of the pellets.

When pellets containing iron ore and carbonaceous reducing agent are heated above 900° C. the carbonaceous materials act with the oxygen in the ore and this reduces the pellets progressively inwardly. Heretofore it has been supposed that the carbonaceous material and evolved CO gas would protect the newly reduced metal. However, we have found that once the carbon has volatized off from the outer part of a pellet the freshly reduced surfaces will be substantially pyrophoric and will very quickly reoxidize if the atmosphere has any oxidizing effect. This means that there is a great waste of carbonaceous material and the product is far from being sponge iron and ordinarily has to undergo substantial additional reduction in a smelting furnace.

In accordance with the present invention we make pellets comprising iron ore and carbonaceous material such as coal or coke, preferably in approximately stoichiometric proportion of reducing agent as required for the complete reduction. If complete reduction is not demanded the amount of carbonaceous material may be reduced somewhat but ordinarily a slight excess over the stoichiometric proportion should be used. These pellets are then treated in an appropriate apparatus with a hot gas that is definitely not oxidizing. Since the gas is to be the source of heat and therefore has been subjected to combustion, the air employed must be carefully controlled so that the gas used for treating the pellets will comprise CO (and usually some $H_2$) in such proportion that the ratio of CO to the sum of the CO plus the $CO_2$ (and similarly the ratio of the $H_2$ to the sum of the $H_2$ and $H_2O$) is at least 0.67. Preferably this ratio is somewhat higher, say about 0.7 and it is even better to have it as high as 0.75. A higher proportion of CO is not necessary for it is to be remembered that this gas is used essentially to bring heat to the pellets and not as a primary reducing agent. Since the gas is to supply the heat to the pellets it must be heated high enough to raise the temperature of the pellets up to 900° C. and also to supply the heat of reduction. This means that the gas must definitely have a temperature above 900° C. and the temperature may range up to about 1150° C. For ordinary purposes a gas at a temperature of about 1100° C. is satisfactory.

The treatment of the pellets can take place in any appropriate type of apparatus. We have found a shaft type furnace is excellent for this purpose and therefore it is shown in our illustrative example. However, other types of furnace giving good contact between gas and pellets may be used such as a furnace employing traveling grates covered by gas hoods or the like. The process may be employed for substantially complete reduction of the pellets or for partial reduction and preheating with the pellets subsequently being introduced into an electric pig-iron furnace for final reduction and smelting.

The gas is preferably prepared and brought up to temperature by burning hydrocarbon material with limited and controlled amounts of air in a separate combustion chamber. The hydrocarbon may range anywhere from methane to fuel oil, the important feature being that the air is so controlled that the ratio of CO to the sum of the CO plus $CO_2$ in the products of combustion must exceed 0.67. Actually the best way of carrying out this process is to burn natural gas or gases that result from cracking processes. Since, as stated, this gas is not intended as a reducing agent but is intended to be used as a heating means, relatively large quantities of gas will have to be employed, sufficient to carry the necessary calories for bringing the pellets up to reduction temperature of at least 900° C. and for supplying the heat of reduction. While some other source of heat may be employed as a supplement, it would not supply oxidizing products of combustion to reduce the CO proportion below the required percentage. The exact amount of gas required for the process will vary depending upon preliminary heating of the pellets and the like but it can be readily computed.

As this process proceeds, gas will be evolved from the pellets and it will be found that this gas will have a composition more or less corresponding to the heating gas employed, that is it will have an excess of CO above that to meet the required ratio stated above. As a result, large quantities of gas will be withdrawn from the process. Such gas will ordinarily have a calorific value of from about 900 to 1000 kcal. $Nm.^3$ which is about the same as blast furnace gas.

The apparatus of the earlier filed application may also be used with great advantage for preheating the charge to an electric furnace without any prereduction or with only a negligible amount of prereduction. In such case the temperature of the gas for preheating the charge will be between about 700° C. and 900° C. Lower temperatures may be employed but no particular advantage is realized as the overall efficiency of the preheating operation starts to decrease at temperatures below 600° C. Since there is no prereduction of iron oxide or only a negligible amount of prereduction at temperatures below 900° C. it is not necessary to control the composition of the gas supplied to the preheating shaft. But it has been discovered that the efficiency of the preheating operation is materially increased if the amount of air employed for combustion of the gas is controlled to supply hot gas in which the ratio of CO to the sum of the CO plus $CO_2$ (and similarly the ratio of $H_2$ to the sum of $H_2$ and $H_2O$) is at least 0.10 and preferably as the temperature of the gas increases from 700° C. to 900° C. the ratio of CO in the gas is progressively increased to 0.67. Control of the composition of the preheating gas reduces the tendency for the $CO_2$ and $H_2$ and the O of the preheating gas to combine with carbonaceous material in the charge to form CO and thereby reduce the efficiency of the preheating operation. The characteristics of the plant and raw materials employed will determine the particular temperature selected for the preheating operation to establish the desired overall heat balance for maximum efficiency.

As previously described hereinabove any available type of preheating furnace may be employed for carrying out the process of the present invention. But the form of apparatus illustrated in the drawings has special advantages over conventional apparatus. First of all in accordance with the present invention the preheating shaft and electric smelting furnace are combined into a single integral unit, with the preheating shaft forming along its entire length an enclosed space integrally communicating with the furnace, wherein the preheated charge is fed directly from the shaft into the electric furnace without contact with atmospheric air. Positive control of the temperature and composition of hot gas for preheating the charge is achieved by establishing a gas tight seal between the preheating shaft and electric furnace and the seal prevents the gas in the preheating shaft from entering the furnace. The gas for preheating the charge is burned in a separate combustion chamber positioned outside the preheating shaft and samples of gas entering the preheating shaft may be readily taken and analyzed in conventional manner. The temperature and composition of gas entering the preheating shaft may be readily controlled by adjusting the volume and composition of gas and the amount of air supplied to the separate combustion chamber. Another advantage of the separate combustion chamber is that the charge is not directly subjected to the intense heat generated during combustion of the gas and this tends to eliminate sintering and hanging of the charge in the preheating shaft.

Another important feature of the present apparatus involves the collection and withdrawal of the hot combustion gas from the shaft at a substantial distance below the surface of the charge. As a result there is a layer of cold charge above the preheating zone which provides an air seal to protect the preheated charge and carbonaceous material from the oxidizing effect of atmospheric air. Because of the air seal of the charge there is no need for a protective cover over the mouth of the preheating shaft which is of great practical advantage in feeding the charge into the shaft. A single shaft may be employed to feed preheated charge to a plurality of electrodes of a single preheating shaft may be employed for each individual electrode.

The charge to the preheating shaft is preferably in the form of pellets but this is not necessary as long as the charge is of particulate material sufficiently porous to allow passage of the preheating gas up through the charge in the shaft. The process and apparatus of the present invention is of particular utility for preheating iron and other metallic oxides which are reduced by heat in the presence of carbonaceous material. In such case the problem of reoxidation of reduced metal oxides and the problem of loss of carbon in the charge during the preheating operation are present regardless of the particular type of metal oxide employed in the charge. It will also be understood that the apparatus has utility for preheating any type of charge to an electric furnace such as those used for the production of ferro alloys, carbide, phosphorus and the like. In all cases a combustible gas is generated in the electric furnace which may be employed with advantage for preheating the charge.

In the accompanying drawings:

FIG. I is a schematic sectional view of a plant utilizing one preferred form of apparatus for carrying out the process of the present invention.

FIG. II is a schematic sectional view of a slightly modified form of the plant of FIG. I.

In FIG. I of the drawings 1 is a storage bin for the pellets. Control apparatus indicated at 2 feeds the pellets in predetermined quantities onto a conveyor belt 3 which delivers them into a hopper 6. From the hopper 6 the valve 4 lets the pellets in proper amounts into the shaft furnace 5. It is understood that the shaft furnace is only indicated here schematically and actually it will be a device equipped with a refractory lining.

At the bottom of the shaft furnace 5 is a discharge mechanism 7 which as shown is a conventional rotary valve for gas tight discharge of the hot prereduced charge which slides through one or more pipes 8 down through charging openings 9 in the roof of the electric furnace 10. The electric furnace is further provided with a casing 11 and a refractory lining 12. The current is supplied to the charge 13 by means of electrodes 14 which pass through the furnace roof. The liquid metal 15 and slag 16 collect in the bottom of the furnace and are tapped at regular intervals in usual manner. The gas is exhausted from the furnace through a pipe 17, in the furnace roof. Such gas is cooled and cleaned by addition of water for example through nozzle 18 and is further cleaned as it passes through the fan 19. This fan forces the clean gas into the clean gas pipe 20.

The gas pipe 20 is provided with a valve 32 which will permit a controlled amount of this gas (if desired) to pass into the pipe line 21. Excess gas is discharged through pipe 33 provided with valve 34. A combustion gas, such as natural gas rich in methane, or cracking gas may be admitted in controlled amounts through valve 22 and pass into pipe 21. The gas then passes into the combustion chamber 24 where it burns with a controlled amount of air supplied through a fan 23. The hot combustion gases with the proper proportion of CO and at the proper temperature pass from here into the lower part of the shaft 5 through inlet ducts 25 where it is distributed by members 26. The gas passes upward through the shaft in countercurrent to the charge and is drawn out through the outlet openings 27 and the pipe 28. The hot discharge gas is freed from some of its dust content in the dust separator 29. As the dust separator and the shaft will set up some resistance, a fan 30 is supplied to suck the gas through the system. From the fan 30, the waste gas passes through pipe 31 to any desired point of use such for example at a steam plant.

As an example of our process to be carried on with the apparatus just described we selected the case where iron ore is to be partly prereduced and preheated in the shaft furnace and then is passed into the electric smelting furnace for final smelting.

Finely powdered iron ore (50%–90% minus 200 mesh Taylor) was pellitized together with slightly more than the stoichiometric proportion of bituminous coal necessary for reduction using 5% Portland cement as a binding agent. The raw pellets were hardened by storing for at least three days whereby they attained a point strength of about 50 kgs. The self-hardened pellets were stored in the storage bin 1 from which they were discharged into the hopper 6 as previously described.

To prepare the gas, in this instance we used natural gas rich in methane. With an ore containing 55%–65% Fe. we used about 420 Nm.$^3$CH$_4$ per 1000 kgs. pig iron produced. Methane was admitted into the pipe 21 through the valve 22 and air was introduced by the fan 23 in such proportions that one mol CH$_4$ gave 13 mole of combustion gas. In these proportions the combustion gas reached a temperature of about 1100° C.

By using the 420 Nm.$^3$ methane per metric ton of pig iron and using the proportions of air stated above, a partially combusted gas of the following composition was obtained:

| | Percent |
|---|---|
| H$_2$ | 23 |
| CO | 12 |
| H$_2$O | 8 |
| CO$_2$ | 4 |
| N$_2$ | 53 |

This gas had the ratio of CO to the sum of the CO plus $CO_2$ equal to about 0.75 which has no oxidizing effect upon the metallic iron since the equilibrium at 900° C. is 0.67.

The heat content of the gas was sufficient to cover the heat requirement for prereduction of the oxides of the iron ore by means of the carbon in the pellets and 50%–70% of the oxygen content of the ore was removed in the shaft furnace and the pellets preheated to a temperature of approximately 900° C.

The charge was transferred to the electric furnace through the pipe 8 directly, without cooling, and smelted with a power consumption of 900–1000 kwh. per ton of pig iron. This may be compared with the usual consumption in pig iron production in the same furnace of from 2000–3000 kwh. per ton. These figures indicate that the pig iron production per kwh. was increased two to three times.

About 30%–35% of the combustion value of the natural gas was utilized in the prereduction furnace and some additional gas was generated from the reduction of the iron ore. The resulting exit gas still contained large combustion values which were used in a steam generator.

It is to be noted that in this particular example none of the furnace gas was employed in the combustion chamber 24. However, in some instances small amounts of such furnace gas may be used to increase the volume of gas, provided that the necessary proportions of CO and the necessary temperature are maintained.

It is understood that the example given is intended only by way of illustration and the same may be modified in many particulars.

The modified form of apparatus shown in FIG. II is substantially identical with that shown in FIG. I and identical parts have been given the same reference numerals. In the form of apparatus shown in FIG. II there is no gas tight rotary valve discharge mechanism 7. In place of this a pipe 36 is connected to the opening in the bottom of shaft 5 and the mouth of pipe 36 is positioned above a discharge table 38 which is rotated by means of the motor 40, shaft 42 and gears 44. The rotatable discharge table is enclosed in a gas tight housing 46 which connects pipe 8 with the pipe at the bottom of shaft 5. When charge is required in the furnace the discharge table is rotated to feed charge into the housing and by means of one or more pipes 8 the preheated charge is distributed around the electrodes in the furnace. Shaft 5 at all times keeps pipe 36 filled with preheated charge and the charge in the pipe forms a gas tight seal between the shaft and furnace which prevents gas from passing from one unit to the other. In the form of apparatus shown in FIG. II a pipe 48 connects the discharge gas pipe 31 with the combustion chamber 24 and by means of the valve 50 any desired proportion of hot gas from the shaft may be recycled for added control of the composition and volume of gas being fed to the combustion chamber. Otherwise the construction and operation of the apparatus of FIG. II is identical with that described in FIG. I. Any suitable feed arrangement (not shown) may be employed for feeding the charge to the preheating shaft. As previously described a cold layer of charge is maintained above the gas collection pipe 27 to provide an air seal above the preheating zone to protect the charge from the oxidizing effect of atmospheric air.

Gas from the electric furnace is rich in CO while the gas taken from shaft 5 will contain less CO. The desired composition of gas fed to the chamber 24 may be achieved by proper blending of the two gases and air plus the addition of methane or other hydrocarbon gas if that should prove necessary to obtain the desired composition and temperature for gas entering shaft 5.

It will be understood that it is intended to cover all changes and modifications of the preferred form of invention herein chosen for the purpose of illustration which do not constitute departure from the spirit and scope of the invention.

We claim:

1. The method of preheating a charge which generates combustible gas in an electric furnace of the type in which charge is fed into one end of an enclosed space which end is open and exposed to the atmosphere and in which the opposite end of said enclosed space is integrally connected to the electric furnace which comprises the steps of, withdrawing combustible gas from the furnace, burning the combustible gas in a zone located outside the enclosed space, introducing the hot burned combustible gas from the burning zone into the enclosed space, passing the hot burned combustible gas through a portion of said enclosed space in counter-current flow to the charge therein to establish a preheating zone in the enclosed space and preheat the charge, withdrawing the burned combustible gas from said enclosed space at a point below the open exposed end thereof, maintaining a cold layer of charge above the area of withdrawal of hot combustion gas and thereby protecting the charge being preheated in the preheating zone from atmospheric air, accumulating a body of charge in the portion of the enclosed space intermediate the furnace and the point of introduction of burned combustible gas to establish a gas seal intermediate the furnace and the preheating zone to prevent combustible gas generated in the furnace from entering the preheating zone, and feeding the preheated charge from the enclosed space into the furnace.

2. The method specified in claim 1 in which the combustible gas is burned with a controlled amount of air to provide hot gas entering the preheating shaft at a temperature between about 700° C. and 1150° C. and a ratio of CO to CO plus $CO_2$ of at least 0.10.

3. Apparatus for preheating a charge to an electric furnace having a vertical shaft the upper end of said shaft being open and exposed to the atmosphere, means positioned at the bottom of the shaft for establishing a gas seal between the shaft and furnace and for feeding the charge from the shaft into the furnace, a combustion chamber positioned outside the shaft with an opening connected to the bottom end portion of the shaft, a pipe which connects the combustion chamber with the electric furnace for supplying combustible gas to said chamber, means for supplying air to the combustion chamber to burn the combustible gas, means associated with the opening in the combustion chamber for feeding the hot gas into the charge in the shaft above the gas seal to pass the gas upwardly through the charge in countercurrent flow, means for collecting and withdrawing the hot gas from the shaft positioned in the top end portion below the open exposed end thereof, means for feeding charge into the open exposed end of the shaft to provide a cold layer of charge above the collecting means to protect the preheated charge from atmospheric air.

4. Apparatus as specified in claim 3 in which a pipe connects the gas collection means with the combustion chamber for recycling gas withdrawn from the shaft.

5. Apparatus as specified in claim 3 in which the means for establishing a gas seal and for feeding the charge from the shaft into the furnace comprises a pipe which connects the shaft with the electric furnace and a rotary gas tight discharge valve positioned at the bottom of the shaft.

6. Apparatus as specified in claim 3 in which the means for establishing a gas seal and for feeding the charge from the shaft into the furnace comprises a first pipe for feeding charge into the furnace, a rotary table positioned below the bottom of the shaft adapted to feed charge to the table, a gas tight housing surrounding said table which connects the said first and second feed pipes, means for rotating the table to distribute the charge from the shaft to the housing and second feed pipe whereby the charge in the pipe at the bottom of the shaft provides a gas seal separating the shaft and furnace.

7. Apparatus as specified in claim 3 which includes a pipe for feeding combustible gas from a separate source into the said chamber.

8. Apparatus as specified in claim 3 which includes means between the furnace and combustion chamber for cleaning the hot combustible gas from the furnace before it enters the combustion chamber.

References Cited in the file of this patent
UNITED STATES PATENTS

| | | |
|---|---|---|
| 1,370,915 | Riveroll | Mar. 8, 1921 |
| 2,108,118 | Greenawalt | Feb. 15, 1938 |
| 2,330,487 | Grace | Sept. 28, 1943 |
| 2,358,024 | Najarian | Sept. 12, 1944 |
| 2,368,508 | Wile | Jan. 30, 1945 |
| 2,528,533 | Royster | Nov. 7, 1950 |
| 2,694,097 | Collin | Nov. 9, 1954 |
| 3,033,673 | Collin et al. | May 8, 1962 |

UNITED STATES PATENT OFFICE
CERTIFICATE OF CORRECTION

Patent No. 3,163,520            December 29, 1964

Fredrik Christen Collin et al.

It is hereby certified that error appears in the above numbered patent requiring correction and that the said Letters Patent should read as corrected below.

Column 3, line 47, for "of", second occurrence, read -- or --; column 8, line 9, for "2,528,533" read -- 2,528,553 --.

Signed and sealed this 10th day of August 1965.

(SEAL)
Attest:

ERNEST W. SWIDER
Attesting Officer

EDWARD J. BRENNER
Commissioner of Patents